United States Patent
Ryu et al.

(10) Patent No.: US 9,405,506 B2
(45) Date of Patent: Aug. 2, 2016

(54) METHOD OF OPERATING SYSTEM ON CHIP AND APPARATUSES INCLUDING THE SAME

(71) Applicant: SAMSUNG ELECTRONICS CO., LTD., Suwon-si, Gyeonggi-do (KR)

(72) Inventors: Jeong Woo Ryu, Suwon-si (KR); Yong Jun Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 221 days.

(21) Appl. No.: 14/094,101

(22) Filed: Dec. 2, 2013

(65) Prior Publication Data
US 2014/0173325 A1    Jun. 19, 2014

(30) Foreign Application Priority Data

Dec. 13, 2012    (KR) .......................... 10-2012-0145608

(51) Int. Cl.
*G06F 1/04*    (2006.01)
*G06F 5/06*    (2006.01)
*G06F 13/16*    (2006.01)
*G06F 1/32*    (2006.01)

(52) U.S. Cl.
CPC .............. *G06F 5/06* (2013.01); *G06F 13/1689* (2013.01); *G06F 1/3203* (2013.01)

(58) Field of Classification Search
CPC ..................................... G06F 1/08; G06F 7/00
USPC ....................................................... 713/601
See application file for complete search history.

(56) References Cited

U.S. PATENT DOCUMENTS

| | | | |
|---|---|---|---|
| 6,456,560 B2 | 9/2002 | Arimoto et al. | |
| 6,731,554 B1 | 5/2004 | Jacob et al. | |
| 6,807,116 B2 | 10/2004 | Yamazaki et al. | |
| 7,216,271 B2 | 5/2007 | Tanaka et al. | |
| 7,567,880 B2 * | 7/2009 | Iizuka | G11C 7/1066 327/241 |
| 7,755,955 B2 | 7/2010 | Seo | |
| 7,886,206 B2 | 2/2011 | Park et al. | |
| 8,042,015 B2 | 10/2011 | Choi | |
| 8,565,033 B1 * | 10/2013 | Manohararajah | G11C 29/028 365/129 |
| 8,565,034 B1 * | 10/2013 | Lu | G11C 7/22 365/189.05 |
| 2003/0028835 A1 | 2/2003 | Ishikawa | |
| 2003/0074623 A1 | 4/2003 | Takahashi | |
| 2004/0095799 A1 | 5/2004 | Jacob et al. | |
| 2007/0245200 A1 * | 10/2007 | Hattori | G11C 29/028 714/742 |
| 2008/0155141 A1 * | 6/2008 | LaBerge | G06F 13/1689 710/60 |
| 2011/0211404 A1 * | 9/2011 | Raghunathan | G11C 7/1066 365/193 |
| 2012/0047411 A1 * | 2/2012 | Lai | G01R 31/31937 714/721 |
| 2012/0089857 A1 * | 4/2012 | Sharma | G06F 13/4243 713/503 |
| 2014/0254294 A1 * | 9/2014 | Kizer | G06F 13/1689 365/193 |

FOREIGN PATENT DOCUMENTS

| | | | |
|---|---|---|---|
| JP | 2002042498 A | 2/2002 | |
| JP | 2005293622 A | 10/2005 | |
| JP | 3934384 B2 | 6/2007 | |
| JP | 2011017604 A | 1/2011 | |
| JP | 2011253501 A | 12/2011 | |

* cited by examiner

*Primary Examiner* — Thomas Lee
*Assistant Examiner* — Volvick Derose
(74) *Attorney, Agent, or Firm* — Sughrue Mion, PLLC

(57) ABSTRACT

A method of operating a system on chip (SoC), an integrated circuit including the SoC, and a system including the same are provided. The method includes: delaying a data strobe signal; obtaining a setup margin and a hold margin by adjusting a delay of the delayed data strobe signal; and determining a data valid window using the obtained setup margin and the obtained hold margin.

17 Claims, 8 Drawing Sheets

METHOD OF OPERATING SYSTEM ON CHIP AND APPARATUSES INCLUDING THE SAME

CROSS-REFERENCE TO RELATED APPLICATION

This application claims priority from Korean Patent Application No. 10-2012-0145608, filed on Dec. 13, 2012 in the Korean Intellectual Property Office, the disclosure of which is hereby incorporated by reference in its entirety.

BACKGROUND

Methods and apparatuses consistent with exemplary embodiments relate to an integrated circuit, and more particularly, to a method of operating a system on chip (SoC) for testing the integrity of signals between the SoC and a memory device and apparatuses including the SoC.

With the development of mobile products such as tablet personal computers (PCs) and mobile phones, high performance of integrated circuits including a SoC and a memory device is demanded.

The SoC and the memory device exchange data signals and data strobe signals with each other. In order to achieve the high performance of the integrated circuits, the speed of signals transferred between the SoC and the memory device is to be increased. However, with the increase in the signal speed, signal integrity problems may be induced by ringing, crosstalk, or ground bounce. The signal integrity problems may cause the malfunction of the integrated circuits. Therefore, a method of testing signal integrity is desired.

SUMMARY

According to an aspect of an exemplary embodiment, there is provided a method of operating a system on chip (SoC), the method including: delaying a data strobe signal; obtaining a setup margin and a hold margin by adjusting a delay of the delayed data strobe signal; and determining a data valid window using the obtained setup margin and the obtained hold margin.

The determining the data valid window may include adding the obtained setup margin and the obtained hold margin and determining a result of the adding as the data valid window.

The method may further include assessing signal integrity using the data valid window.

The assessing the signal integrity may include comparing the determined data valid window with a threshold value and determining the signal integrity based on a result of the comparing.

According to an aspect of another exemplary embodiment, there is provided an integrated circuit including: a memory device configured to output a data signal and a data strobe signal; and a SoC including a memory controller configured to control the memory device.

The memory controller may include an input/output interface configured to receive the data signal and the data strobe signal, a physical interface configured to delay the data strobe signal and to latch data from the data signal according to the delayed data strobe signal, and a memory control block configured to control the physical interface.

The SoC may obtain a setup margin and a hold margin according to the latched data using a test program and determine a data valid window using the setup margin and the hold margin.

The physical interface may include: a data strobe signal DQS delay circuit configured to delay the data strobe signal and to output the delayed data strobe signal in response to a selection signal; and latches configured to latch the data from the data signal according to the delayed data strobe signal.

The memory control block may generate the selection signal for controlling the DQS delay circuit so as to obtain the setup margin and the hold margin.

The memory control block may determine the data valid window by adding the setup margin and the hold margin.

The memory control block may assess signal integrity between the memory device and the SoC using the determined data valid window.

The integrated circuit may be implemented by a package on package (PoP).

According to an aspect of another exemplary embodiment, there is provided a system including the above-described integrated circuit and a display configured to display image data output from the integrated circuit.

The system may be a portable device.

According to an aspect of another exemplary embodiment, there is provided a system on chip (SoC) for controlling a memory device, the SoC including: an input/output interface configured to receive, from the memory device, a data signal and a data strobe signal; and a physical interface configured to delay the received data strobe signal; and a processor configured to obtain a setup margin and a hold margin according to the delayed data strobe signal and to determine a data valid window using the obtained setup margin and the obtained hold margin.

BRIEF DESCRIPTION OF THE DRAWINGS

The above and other features and advantages will become more apparent by describing in detail exemplary embodiments with reference to the attached drawings in which.

DETAILED DESCRIPTION OF EXEMPLARY EMBODIMENTS

Figure 1:
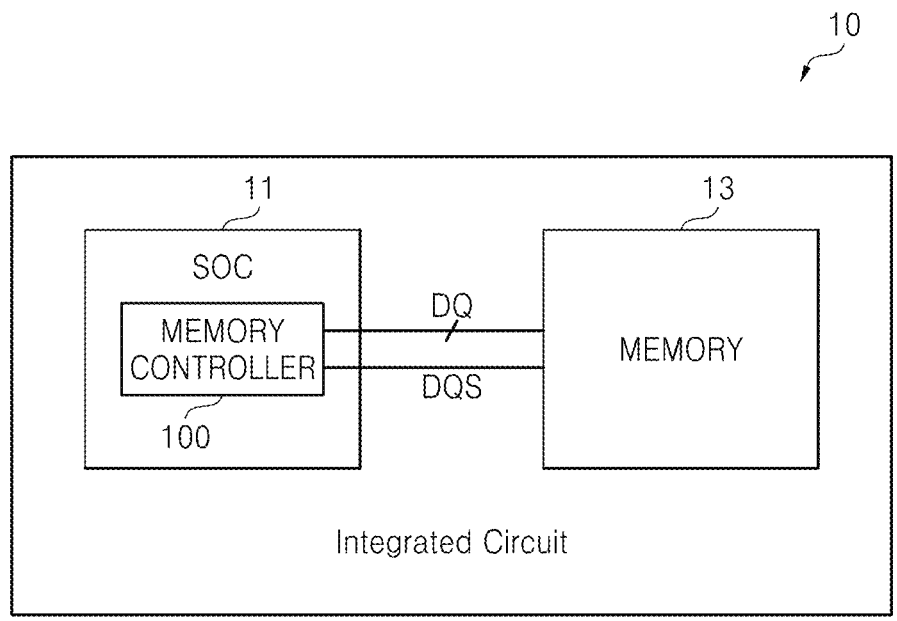
FIG. 1 is a block diagram of an integrated circuit according to an exemplary embodiment.

Exemplary embodiments will now be described more fully hereinafter with reference to the accompanying drawings, in which like reference numerals refer to like elements throughout. Exemplary embodiments may, however, be embodied in many different forms and should not be construed as limited to exemplary embodiments set forth herein. Rather, these exemplary embodiments are provided so that this disclosure will be thorough and complete, and will fully convey the scope of the inventive concept to those skilled in the art. In the drawings, the size and relative sizes of layers and regions may be exaggerated for clarity.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc., may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular exemplary embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of an integrated circuit 10 according to an exemplary embodiment. The integrated circuit 10 may be used in mobile devices such as tablet personal computers (PCs), mobile phones, etc. The integrated circuit 10 includes a system on chip (SoC) 11 and a memory device 13.

The SoC 11 includes a plurality of elements in a single chip. The SoC 11 may include a memory controller 100 for controlling the memory device 13. The SoC 11 may be referred to as an application processor in one or more exemplary embodiments.

The memory device 13 communicates with the memory controller 100. In particular, the memory device 13 transmits/receives data signals DQ and a data strobe signal DQS to/from the memory controller 100.

The memory controller 100 uses the data strobe signal DQS in order to transmit/receive the data signals DQ. The memory device 13 is a volatile memory device such as a dynamic random access memory (DRAM) device. The memory device 13 is used in the mobile devices.

It is understood that the memory device 13 may be implemented by non-volatile memory such as read-only memory (ROM), programmable ROM (PROM), erasable PROM (EPROM), electrically EPROM (EEPROM), flash memory, ferroelectric random access memory (FRAM), magnetic RAM (MRAM), phase-change RAM (PRAM), nano RAM (NRAM), silicon-oxide-nitride-oxide-silicon (SONOS), resistive memory, racetrack memory, etc. Although only one memory device 13 is illustrated in FIG. 1, it is understood that one or more exemplary embodiments are not limited thereto. For example, the integrated circuit 10 may include a plurality of memory devices according to another exemplary embodiment.

Figure 2:
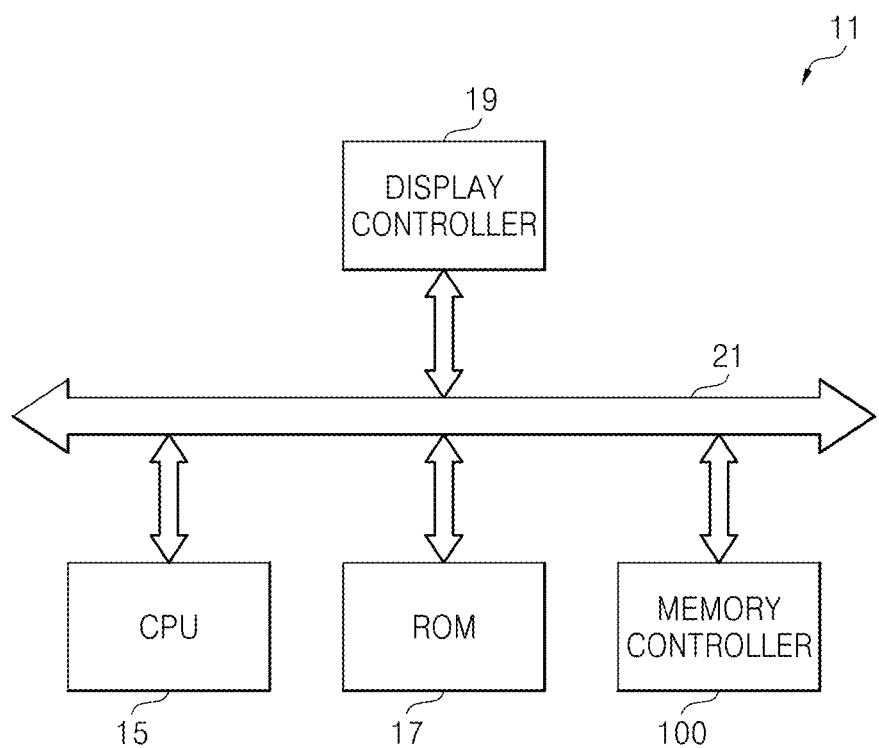
FIG. 2 is a block diagram of a system on chip (SoC) illustrated in FIG. 1.

FIG. 2 is a block diagram of the SoC 11 illustrated in FIG. 1. Referring to FIGS. 1 and 2, the SoC 11 includes a central processing unit (CPU) 15, a ROM 17, and the memory controller 100.

The CPU 15 executes commands for controlling the memory controller 100. For example, the CPU 15 may execute commands for assessing (e.g., testing) signal integrity between the memory controller 100 and the memory device 13. A test program includes commands for testing the signal integrity. The signal integrity indicates whether the data signals DQ and the data strobe signal DQS have good quality, e.g., a quality/integrity of at least a predetermined threshold.

The ROM 17 may store commands executed by the CPU 15. The ROM 17 may be a non-volatile memory. The memory controller 100 will be described in detail with reference to FIG. 3 below.

The SoC 11 may also include a display controller 19. The display controller 19 controls a display to display image data. The above-described elements 15, 17, 19, and 100 communicate with one another through a bus 21.

Figure 3:
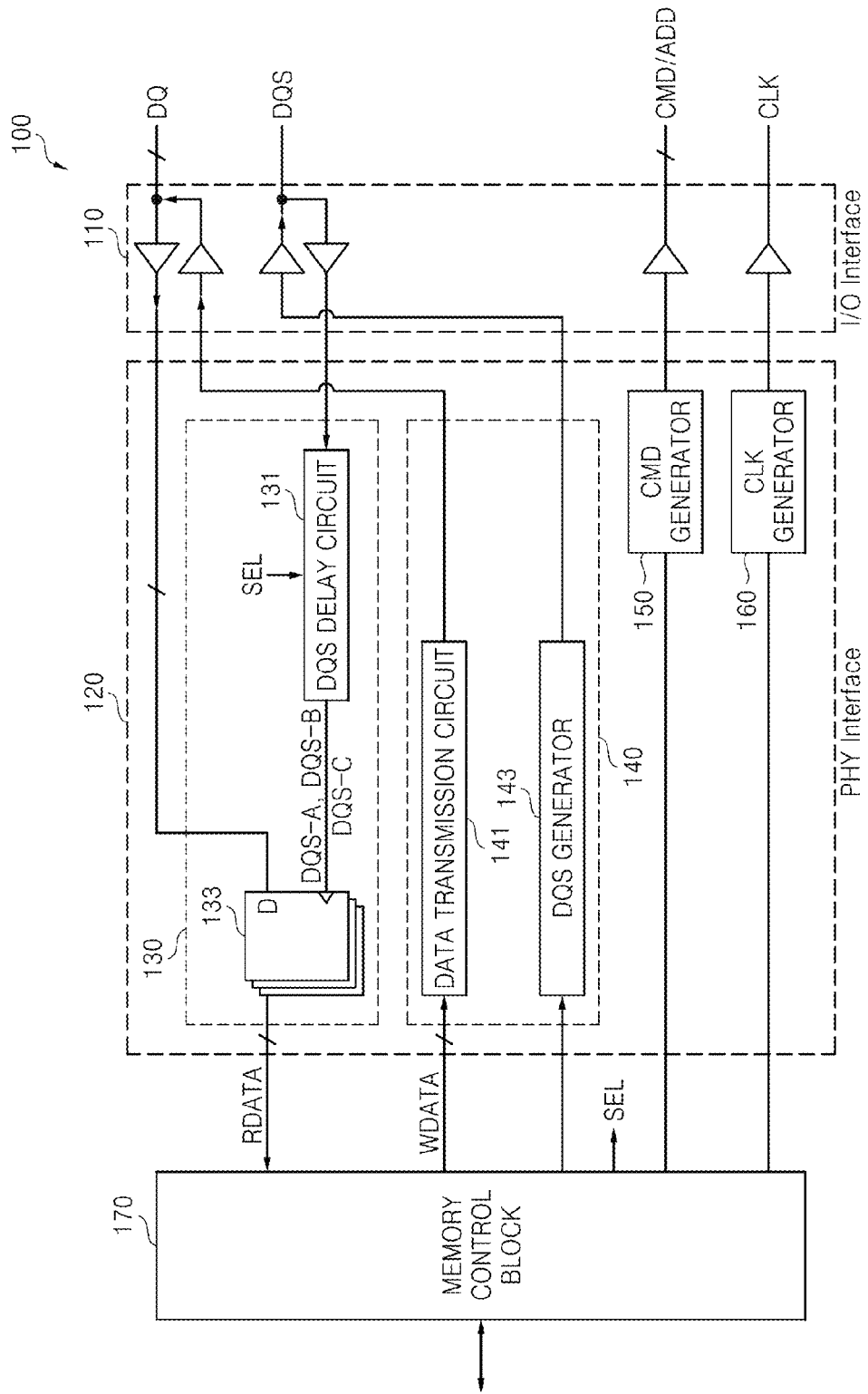
FIG. 3 is a block diagram of a memory controller illustrated in FIG. 2.

FIG. 3 is a block diagram of the memory controller 100 illustrated in FIG. 2. Referring to FIGS. 1 through 3, the memory controller 100 controls the memory device 13. The memory controller 100 includes an input/output (I/O) interface 110, a physical (PHY) interface 120, and a memory control block 170.

The I/O interface 110 transmits/receives the data signals DQ and the data strobe signal DQS to/from the memory device 13. The I/O interface 110 also transmits a command CMD, an address ADD, and a clock signal CLK to the memory device 13. The I/O interface 110 includes a plurality of buffers.

The PHY interface 120 delays the data strobe signal DQS received from the I/O interface 110 and latches data RDATA from the data signals DQ according to a delayed data strobe signal DQS-A, DQS-B, or DQS-C. The PHY interface 120 includes a reading block 130, a writing block 140, a command generator 150, and a clock generator 160.

The reading block 130 is used to read the data RDATA from the data signals DQ output from the memory device 13. The reading block 130 includes a data strobe signal DQS delay circuit 131 and latches 133. The DQS delay circuit 131 delays the data strobe signal DQS output from the memory device 13 and outputs the delayed data strobe signal DQS-A, DQS-B, or DQS-C in response to a selection signal SEL.

The first data strobe signal DQS-A is a result of delaying the data strobe signal DQS by 90 degrees. The second data strobe signal DQS-B is delayed less than the first data strobe signal DQS-A. The third data strobe signal DQS-C is delayed more than the first data strobe signal DQS-A. The second data strobe signal DQS-B and the third data strobe signal DQS-C are used to test the signal integrity between the SoC 11 and the memory device 13.

The latches 133 latch the data RDATA from the data signals DQ according to the delayed data strobe signal DQS-A, DQS-B, or DQS-C. The latches 133 may be implemented by a D flip-flop. The memory control block 170 outputs the selection signal SEL according to the data RDATA.

The writing block 140 is used to write data WDATA to the memory device 13. The writing block 140 includes a data transmission circuit 141 and a DQS generator 143. The data transmission circuit 141 is configured to output the data WDATA output from the memory control block 170 as the data signals DQ.

The DQS generator 143 generates the data strobe signal DQS under the control of the memory control block 170. The command generator 150 generates the command CMD and the address ADD under the control of the memory control block 170. The command CMD and the address ADD are transmitted to the memory device 13 via the I/O interface 110. The clock generator 160 generates the clock signal CLK under the control of the memory control block 170. The clock signal CLK is transmitted to the memory device 13 via the I/O interface 110.

The SoC 11 obtains (e.g., measures) a setup margin and a hold margin according to the data RDATA using a test program, checks on the validity of I/O data, and calculates a data valid window. The data valid window is a region in which valid data can be latched from the data signals DQ.

The memory control block 170 controls the PHY interface 120. Furthermore, the memory control block 170 generates the selection signal SEL to control the DQS delay circuit 131.

Figure 4:
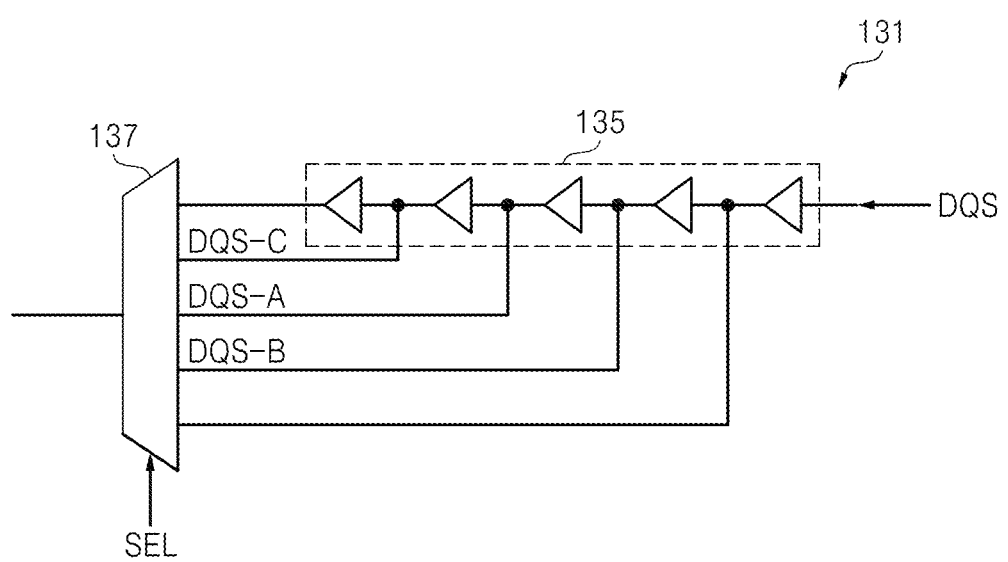
FIG. 4 is a circuit diagram of a data strobe signal DQS delay circuit illustrated in FIG. 3.

FIG. 4 is a circuit diagram of the DQS delay circuit 131 illustrated in FIG. 3. Referring to FIGS. 1 through 4, the DQS delay circuit 131 includes a delay chain 135 and a selector 137.

The delay chain 135 includes a plurality of delay cells connected in series. The delay chain 135 delays the data strobe signal DQS and generates the delayed data strobe signals DQS-A, DQS-B, and DQS-C having different delays. Each of the delay cells may be implemented by a buffer. The selector 137 outputs one of the delayed data strobe signals DQS-A, DQS-B, and DQS-C output from the delay chain 135 in response to the selection signal SEL output from the memory control block 170. The selector 137 may be implemented by a multiplexer.

Figure 5:
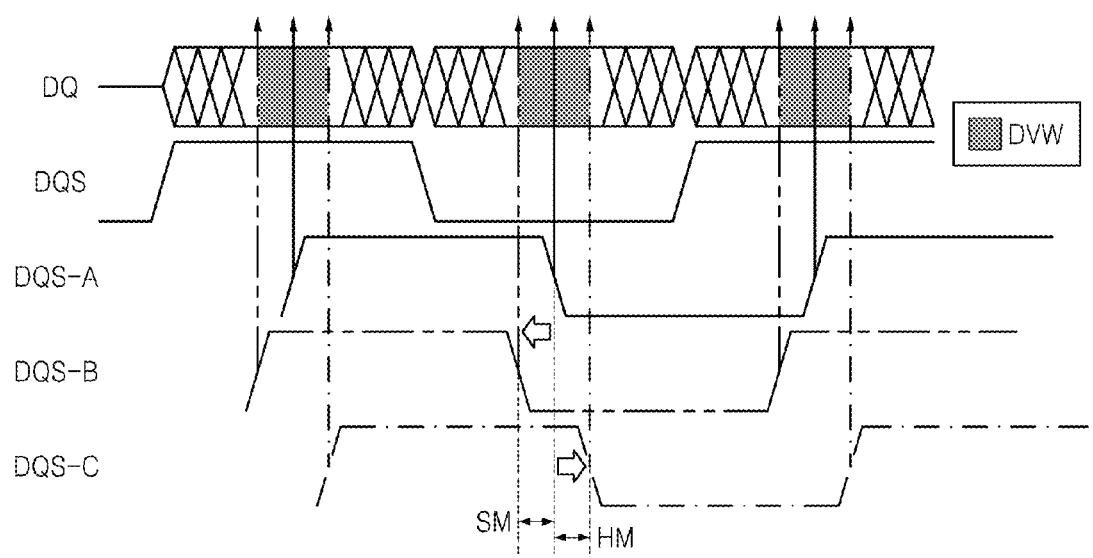
FIG. 5 is a timing chart of signals between the SoC and a memory device illustrated in FIG. 1.

FIG. 5 is a timing chart of signals between the SoC 11 and the memory device 13 illustrated in FIG. 1.

Referring to FIGS. 1 through 5, the memory controller 100 receives the data signals DQ and the data strobe signal DQS from the memory device 13 in order to read the data RDATA. The data signals DQ and the data strobe signal DQS have the same phase. The data signals DQ and the data strobe signal DQS may be used as test signals for testing the signal integrity between the memory device 13 and the SoC 11.

The DQS delay circuit 131 delays the data strobe signal DQS and outputs the first data strobe signal DQS-A in response to the selection signal SEL. The first data strobe signal DQS-A has a 90-degree phase shift from the data strobe signal DQS. The DQS delay circuit 131 delays the data strobe signal DQS and outputs the second data strobe signal DQS-B in response to the selection signal SEL. The second data strobe signal DQS-B has less of a phase shift than the first data strobe signal DQS-A.

When the second data strobe signal DQS-B is output from the DQS delay circuit 131, the memory control block 170 receives the data RDATA that has been finally correctly latched. In other words, the DQS delay circuit 131 repeatedly receives the selection signal SEL until outputting the second data strobe signal DQS-B.

The delay difference between the first data strobe signal DQS-A and the second data strobe signal DQS-B is defined as a setup margin SM. When the DQS delay circuit 131 delays the data strobe signal DQS by more than the setup margin SM, the latches 133 output the data RDATA which is invalid. The setup margin SM may be referred to as a minus margin.

The DQS delay circuit 131 delays the data strobe signal DQS and outputs the third data strobe signal DQS-C in response to the selection signal SEL. The third data strobe signal DQS-C has more of a phase shift than the first data strobe signal DQS-A. When the third data strobe signal DQS-C is output from the DQS delay circuit 131, the memory control block 170 receives the data RDATA that has been finally correctly latched. In other words, the DQS delay circuit 131 repeatedly receives the selection signal SEL until outputting the third data strobe signal DQS-C.

The delay difference between the first data strobe signal DQS-A and the third data strobe signal DQS-C is defined as a hold margin HM. When the DQS delay circuit 131 delays the data strobe signal DQS by more than the hold margin HM, the latches 133 output the data RDATA which is invalid. The hold margin HM may be referred to as a plus margin.

The SoC 11 may measure the setup margin SM and the hold margin HM using the second data strobe signal DQS-B and the third data strobe signal DQS-C in the test program. In addition, the SoC 11 may determine (e.g., decide) a data valid window DVW using the setup margin SM and the hold margin HM in the test program. For instance, the SoC 11 may decide the data valid window DVW by adding the setup margin SM and the hold margin HM.

The SoC 11 may test the integrity of the signals DQ and DQS transferred between the SoC 11 and the memory device 13 using the data valid window DVW. In detail, the SoC 11 compares the data valid window DVW with a threshold value, e.g., a predetermined threshold value.

In other words, the SoC 11 compares the size of the data valid window DVW with the threshold value. When the size of the data valid window DVW is greater than the threshold value, the SoC 11 determines that signal integrity is good. When the size of the data valid window DVW is less than the threshold value, the SoC 11 determines that signal integrity is bad.

A tester tests the signal integrity to determine whether the integrated circuit 10 operates normally. The tester may be connected to the integrated circuit 10 for the test. When the signal integrity is good, the tester determines that the integrated circuit 10 operates normally. When the signal integrity is bad, the tester determines that the integrated circuit 10 operates abnormally.

Figure 6:
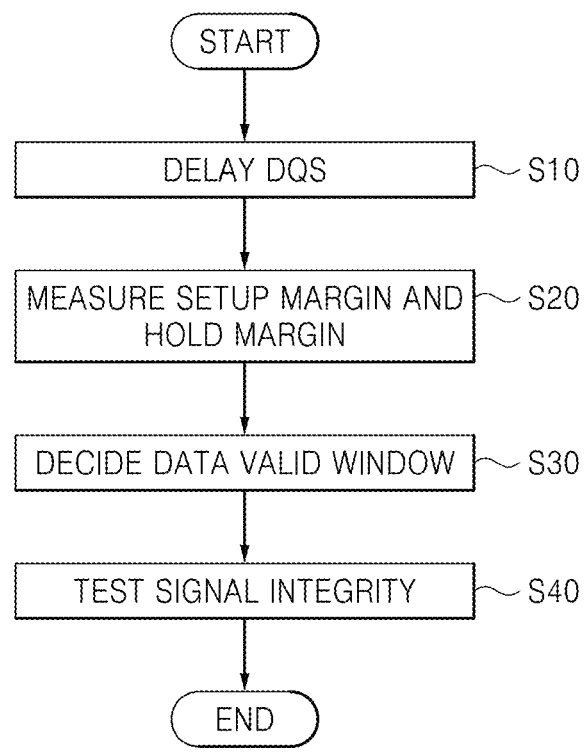
FIG. 6 is a flowchart of a method of operating an SoC according to an exemplary embodiment.

FIG. 6 is a flowchart of a method of operating an SoC 11 according to an exemplary embodiment.

Referring to FIGS. 1 through 6, when the CPU 15 sends, to the memory controller 100, a request signal for a data read operation of the memory device 13, the memory controller 100 requests the memory device 13 to read data in response to the request signal and then receives the data signals DQ and the data strobe signal DQS from the memory device 13.

For the test of the signal integrity between the memory controller 100 and the memory device 13, the DQS delay circuit 131 delays the data strobe signal DQS and outputs the first data strobe signal DQS-A in response to the selection signal SEL in operation S10. For example, the DQS delay circuit 131 delays the phase of the data strobe signal DQS by 90 degrees.

The DQS delay circuit 131 delays the data strobe signal DQS and outputs the second data strobe signal DQS-B in response to the selection signal SEL. When the second data strobe signal DQS-B is output from the DQS delay circuit 131, the memory control block 170 receives the data RDATA that has been finally correctly latched. In other words, the memory control block 170 may measure the setup margin SM using the second data strobe signal DQS-B in operation S20.

The DQS delay circuit 131 delays the data strobe signal DQS and outputs the third data strobe signal DQS-C in response to the selection signal SEL. When the third data strobe signal DQS-C is output from the DQS delay circuit 131, the memory control block 170 receives the data RDATA that has been finally correctly latched. In other words, the memory control block 170 may measure the hold margin HM using the third data strobe signal DQS-C.

The memory control block 170 decides the data valid window DVW using the setup margin SM and the hold margin HM in operation S30. The memory control block 170 may test the integrity of the signals DQ and DQS using the data valid window DVW in operation S40. When the signal integrity is good, e.g., a quality/integrity of at least a predetermined threshold, the tester may determine that the integrated circuit 10 operates normally.

Figure 7:
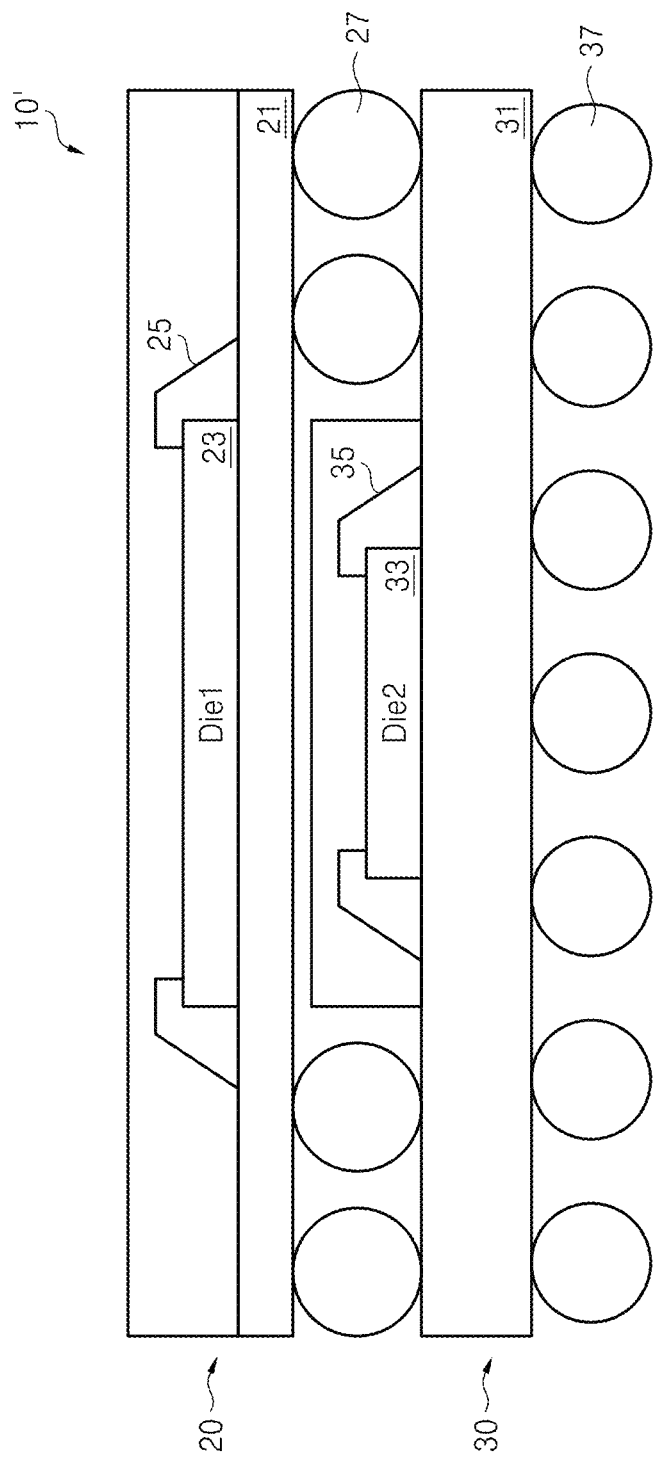
FIG. 7 is a cross-sectional view of a package of an integrated circuit according to an exemplary embodiment.

FIG. 7 is a cross-sectional view of a package of an integrated circuit 10 according to an exemplary embodiment. Referring to FIGS. 1 through 7, the integrated circuit 10 may be implemented by a package on package (PoP) 10'. The PoP 10' includes a top package 20 and a bottom package 30.

The top package 20 includes a first package substrate 21, a first die 23, a bonding wire 25, and solder balls 27. The first package substrate 21 may be referred to as a printed circuit board (PCB). The first die 23 may be the memory device 13. A plurality of dies may be stacked on the first die 23. In other words, the integrated circuit 10 may include a plurality of memory devices. The bonding wire 25 connects the first package substrate 21 with the first die 23. The solder balls 27 attach the first package substrate 21 to the bottom package 30. The top package 20 is stacked on the bottom package 30.

The bottom package 30 includes a second package substrate 31, a second die 33, a bonding wire 35, and solder balls 37. The second die 33 may be the SoC 11. The bonding wire 35 connects the second package substrate 31 with the second die 33. The solder balls 37 attach the second package substrate 31 to a system board or an external device.

A tester tests signal integrity, thereby determining whether the integrated circuit 10 operates normally without disconnecting the first die 23 and the second die 33.

It is understood that, in one or more other exemplary embodiments, the first package substrate 21 and the first die 23 and/or the second package substrate 31 and the second die 33 may be connected with each other using a connecting mechanism or method other than the bonding wire 25 or 35, e.g., by a vertical electrical element such as a through silicon via (TSV).

Figure 8:
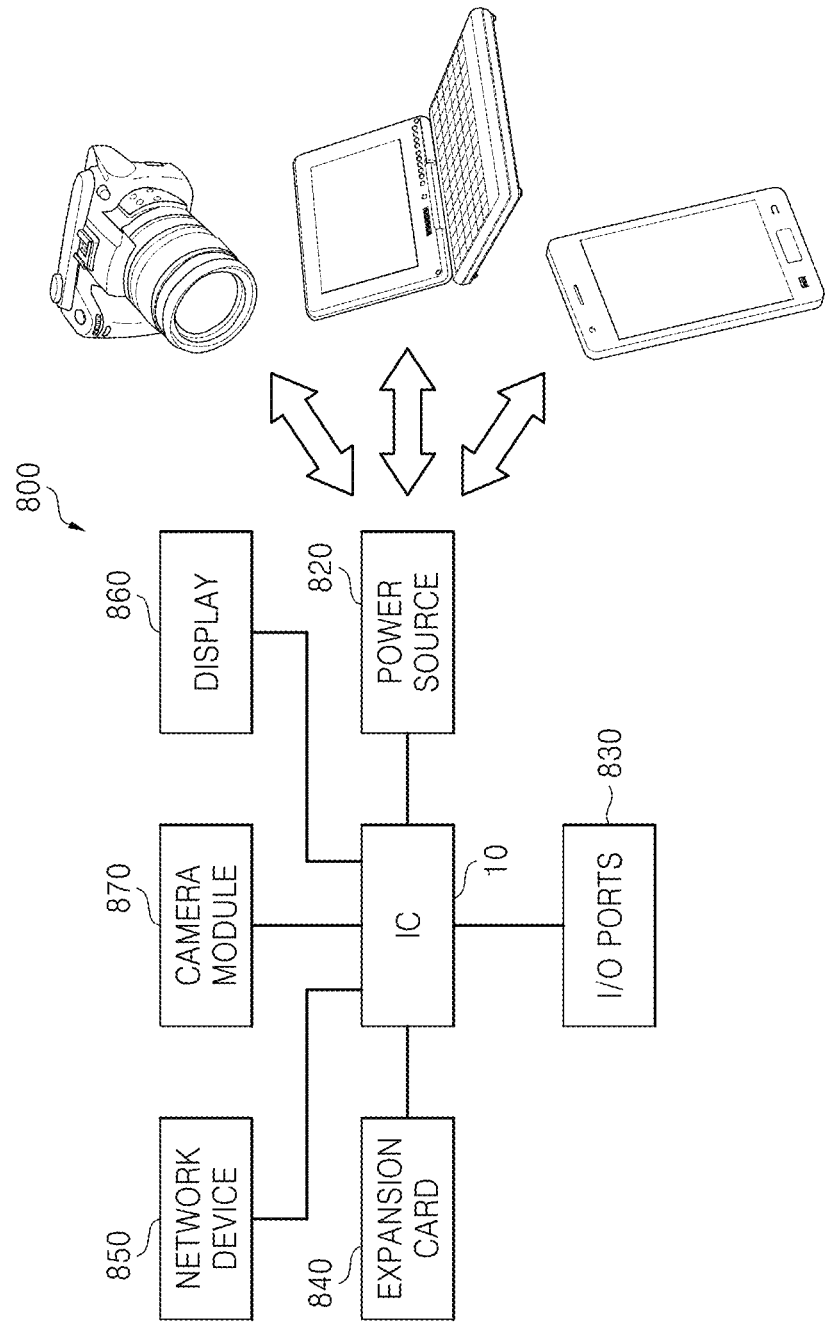
FIG. 8 is a diagram of a system including an integrated circuit according to an exemplary embodiment.

FIG. 8 is a diagram of a system 800 including an integrated circuit 10 according to an exemplary embodiment.

Referring to FIGS. 1 through 8, the system 800 may be implemented as a portable device such as a mobile phone or a tablet PC. The system 800 may include the integrated circuit 10, a power source 820, I/O ports 830, an expansion card 840, a network device 850, and a display 860. The system 800 may also include a camera module 870. The integrated circuit 10 may control the operation of at least one of the elements 820 through 870.

The power source 820 may supply an operating voltage to at least one of the elements 10 and 830 through 870. The I/O ports 830 are ports that receive data transmitted to the system 800 and/or transmit data from the system 800 to an external device.

The expansion card 840 may be implemented as a secure digital (SD) card, a multimedia card (MMC), a subscriber identity module (SIM) card, a universal SIM (USIM) card, etc.

The network device 850 enables the system 800 to connect to a wireless network. The display 860 displays data output from the I/O ports 830, the expansion card 840, and/or the network device 850.

The camera module 870 is a module that can convert an optical image into an electrical image. Accordingly, the electrical image output from the camera module 870 may be stored in the integrated circuit 10 and/or the expansion card 840. In addition, the electrical image output from the camera module 870 may be displayed through the display 860 according to the control of the integrated circuit 10.

As described above, according to one or more exemplary embodiments, apparatuses including a SoC decide a data valid window and test signal integrity between the SoC and a memory device using the data valid window. The apparatuses test the signal integrity, thereby determining whether an integrated circuit operates normally.

While exemplary embodiments have been particularly shown and described above, it will be understood by those of ordinary skill in the art that various changes in form and detail may be made therein without departing from the spirit and scope of the inventive concept as defined by the following claims.

What is claimed is:

1. A method of operating a system on chip (SoC) including a central processing unit (CPU), the method comprising:
  receiving a data strobe signal from a memory device, delaying the data strobe signal, and generating a first data strobe signal that has a 90-degree phase shift from the data strobe signal, a second data strobe signal that has less of a phase shift than the first data strobe signal, and a third data strobe signal that has more of a phase shift than the first data strobe signal;
  obtaining a setup margin based on a delay difference between the first data strobe signal and the second data strobe signal using a test program executed by the CPU;
  obtaining a hold margin based on a delay difference between the first data strobe signal and the third data strobe signal using the test program; and
  determining a data valid window based on the obtained setup margin and the obtained hold margin using the test program.

2. The method of claim 1, wherein the determining the data valid window comprises:
  adding the obtained setup margin and the obtained hold margin; and
  determining, as the data valid window, a result of the adding.

3. The method of claim 1, further comprising assessing signal integrity using the determined data valid window.

4. The method of claim 3, wherein the assessing the signal integrity comprises:
  comparing the determined data valid window with a threshold value; and
  determining the signal integrity based on a result of the comparing.

5. The method of claim 1, wherein the delaying the data strobe signal comprises:
  delaying the received data strobe signal by a first amount to output, as the first data strobe signal, a first delayed data strobe signal;
  delaying the received data strobe signal by a second amount to output, as the second data strobe signal, a second delayed data strobe signal; and
  delaying the received data strobe signal by a third amount to output, as the third data strobe signal, a third delayed data strobe signal.

6. The method of claim 5, wherein the obtaining the setup margin and the hold margin comprises:

obtaining the setup margin as a difference between the output first delayed data strobe signal and the output second delayed data strobe signal; and obtaining the hold margin as a difference between the output first delayed data strobe signal and the output third delayed data strobe signal.

7. An integrated circuit comprising:

a memory device configured to output a data signal and a data strobe signal; and a system on chip (SoC) comprising a memory controller configured to control the memory device and a central processing unit (CPU) configured to execute a test program, wherein the memory controller comprises:

an input/output interface configured to receive the data signal and the data strobe signal;

a physical interface configured to delay the received data strobe signal and to generate a first data strobe signal that has a 90- degree phase shift from the data strobe signal, a second data strobe signal that has less of a phase shift than the first data strobe signal, and a third data strobe signal that has more of a phase shift than the first data strobe signal; and memory control block configured to control the physical interface, and wherein the SoC obtains a setup margin based on a delay difference between the first data strobe signal and the second data strobe signal using the test program executed by the CPU, obtains a hold margin based on a delay difference between the first data strobe signal and the third data strobe signal using the test program, and determines a data valid window based on the obtained setup margin and the obtained hold margin using the test program executed by the CPU.

8. The integrated circuit of claim 7, wherein the physical interface comprises:

a data strobe signal DQS delay circuit configured to delay the received data strobe signal and to output the delayed data strobe signal in response to a selection signal; and latches configured to latch the data from the received data signal according to the delayed data strobe signal.

9. The integrated circuit of claim 8, wherein the memory control block generates the selection signal for controlling the data strobe signal DQS delay circuit so as to obtain the setup margin and the hold margin.

10. The integrated circuit of claim 7, wherein the SoC determines the data valid window by adding the obtained setup margin and the obtained hold margin.

11. The integrated circuit of claim 7, wherein the SoC assesses signal integrity between the memory device and the SoC using the determined data valid window.

12. The integrated circuit of claim 7, wherein the integrated circuit is implemented by a package on package (PoP).

13. A system on chip (SoC) for controlling a memory device, the SoC comprising:

an input/output interface configured to receive, from the memory device, a data signal and a data strobe signal; and a physical interface configured to delay the received data strobe signal and to generate a first data strobe signal that has a 90- degree phase shift from the data strobe signal, a second data strobe signal that has less of a phase shift than the first data strobe signal, and a third data strobe signal that has more of a phase shift than the first data strobe signal; and a processor configured to execute a test program, to obtain a setup margin based on a delay difference between the first data strobe signal and the second data strobe signal using the test program, to obtain a hold margin based on a delay difference between the first data strobe signal and the third data strobe signal using the test program, and to determine a data valid window using the obtained setup margin and the obtained hold margin using the test program.

14. The SoC of claim 13, wherein the physical interface is configured to latch data from the data signal according to the delayed data strobe signal.

15. The SoC of claim 13, wherein the processor obtains the setup margin and the hold margin according to the latched data.

16. The SoC of claim 13, wherein the processor determines the data valid window by adding the obtained setup margin and the obtained hold margin.

17. The SoC of claim 13, wherein the processor assesses signal integrity between the memory device and the SoC using the determined data valid window.

* * * * *